July 4, 1950  T. P. DUNCAN, JR  2,513,461
DEVICE FOR HOLDING FLOWERS
Filed Sept. 29, 1947
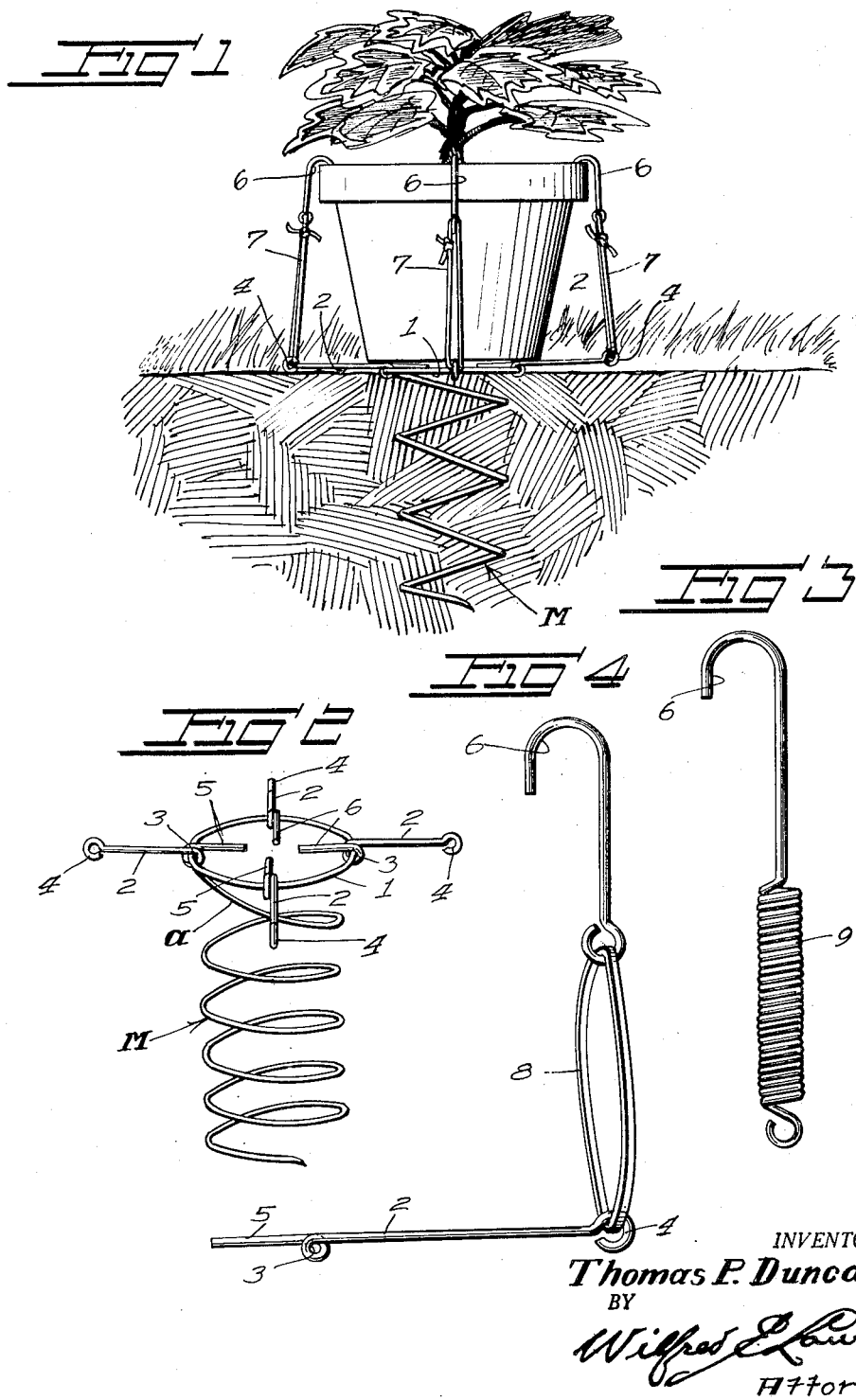
INVENTOR.
Thomas P. Duncan, Jr.
BY
Wilfred E. Lawson
Attorney Patented July 4, 1950

2,513,461

UNITED STATES PATENT OFFICE 2,513,461

DEVICE FOR HOLDING FLOWERS

Thomas P. Duncan, Jr., Newport News, Va.

Application September 29, 1947, Serial No. 776,718

2 Claims. (Cl. 248—154)

This invention relates to a holding device and it is primarily an object of the invention to provide a device of this kind to prevent displacement of potted plants, wreaths, or the like and particularly when placed out in the open.

The invention also has for an object to provide a device of the kind comprising a body member provided with an anchoring medium and wherein the body member has operatively engaged therewith a hold down element for engagement with a flower port, wreath or the like superimposed upon the body member.

The invention consists in the details of construction and in the combination and arrangement of the several parts of my improved holding device for flowers whereby certain advantages are attained, as will be hereinafter more fully set forth.

In order that my invention may be better understood, I will now proceed to describe the same with reference to the accompanying drawings, wherein:

Figure 1 is a view in elevation of a holding device constructed in accordance with an embodiment of the invention and in applied or working position;

Figure 2 is a view in perspective of the device as herein embodied with parts omitted;

Figure 3 is a view in side elevation of a retractile member as comprised in another embodiment; and Figure 4 is a fragmentary elevational view illustrating another embodiment.

As disclosed in the accompanying drawings, 1 denotes a body member herein disclosed as circular in form and of a wire strand of requisite guage having its extremities welded or otherwise rigidly secured whereby the body member is substantially continuous.

The body member 1, has freely mounted thereon for rocking movement a plurality of elongated arms 2, herein shown as four in number, each of which being a metal strand possessing necessary strength. The inner portion of each of the arms 2 is coiled to provide an eye 3 through which the body member 1 is directed, and said inner portion is continued by a relatively short tail piece or arm 5 extending inwardly of the member 1.

The outer extremities of the arms 2 are formed to provide the eye members 4, to which are connected the cords 7, or kindred flexible elements. The outer end portions of these cords are attached to the hook members 6 which engage over the rim of a flower portion or with a wreath, and the like placed upon the body member 1. The hook members 6 may be readily adjusted to a selected point along the members or cords 7, in accordance with the requirements of practice.

When the device is in use it will be noted that the outer ends of the arms 2 will be held against upward swinging movement by contact of the tail pieces or arms 5 with the ground or other surface upon which the body member 1 may be placed.

In lieu of a cord 7, an elastic band 8 may be used as shown in Figure 4 or for a further example a coil spring 9 may be employed as shown in Figure 3.

One extremity of the strand *a* of the body member 1 is continued to form a spiral to provide an anchoring or penetrating member M. This member M may be readily turned down into the ground to assure effective maintenance of the device in desired applied or working position.

From the foregoing description it is thought to be obvious that a holding device constructed in accordance with my invention is particularly well adapted for use by reason of the convenience and facility with which it may be assembled and operated.

I claim:

1. A device for holding a receptacle in position on a flat surface, comprising a flat frame body, a plurality of relatively long arms provided with eyes at the inner portions thereof through which the frame freely passes, the inner ends of the arms being continued by tail pieces extending inwardly of the frame, and engaging elements yieldingly connected to the outer extremities of the arms and adapted to engage the rim of a receptacle resting on the frame.

2. A device for holding a receptacle in position on a flat surface, comprising a circular wire frame, a plurality of wire arms each formed adjacent to one end to provide an eye through which the frame passes whereby the arm is oscillatable on the frame, a portion of each arm extending inwardly of the frame from said eye and a longer portion of the arm extending radially outwardly from the frame, the said longer outwardly extending portion of each arm terminating in a hook, a plurality of hook members, and resilient coupling means between each of said hook members and a hook at the outer end of an arm.

THOMAS P. DUNCAN, Jr.

REFERENCES CITED

The following references are of record in the file of this patent:

UNITED STATES PATENTS

| Number | Name | Date |
|---|---|---|
| 196,396 | Sprague | Oct. 23, 1877 |
| 1,056,669 | Harris | Mar. 18, 1913 |
| 1,162,575 | Craig | Nov. 30, 1915 |
| 2,347,443 | Vesely | Apr. 25, 1944 |
| 2,399,498 | Messick | Apr. 30, 1946 |